US012787116B2

(12) United States Patent
Xiong et al.

(10) Patent No.: US 12,787,116 B2
(45) Date of Patent: Nov. 3, 2026

(54) CPC CONFIGURATION OR CPA CONFIGURATION CANCELLATION METHOD AND APPARATUS THEREOF

(71) Applicant: BEIJING XIAOMI MOBILE SOFTWARE CO., LTD., Beijing (CN)

(72) Inventors: Yi Xiong, Beijing (CN); Yumin Wu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 246 days.

(21) Appl. No.: 18/855,178

(22) PCT Filed: Apr. 8, 2022

(86) PCT No.: PCT/CN2022/085972
§ 371 (c)(1),
(2) Date: Oct. 8, 2024

(87) PCT Pub. No.: WO2023/193275
PCT Pub. Date: Oct. 12, 2023

(65) Prior Publication Data
US 2025/0267762 A1 Aug. 21, 2025

(51) Int. Cl.
*H04W 76/34* (2018.01)
*H04W 36/36* (2009.01)
*H04W 76/20* (2018.01)

(52) U.S. Cl.
CPC ......... *H04W 76/34* (2018.02); *H04W 36/362* (2023.05); *H04W 76/20* (2018.02)

(58) Field of Classification Search
CPC ... H04W 76/34; H04W 36/362; H04W 76/20; H04W 36/0069; H04W 76/15
See application file for complete search history.

(56) References Cited

U.S. PATENT DOCUMENTS

| | | | | |
|---|---|---|---|---|
| 2015/0264612 | A1* | 9/2015 | Baek | H04W 76/27 370/331 |
| 2017/0208488 | A1* | 7/2017 | Hwang | H04W 76/30 |
| 2020/0178332 | A1* | 6/2020 | Sharma | H04W 76/15 |

FOREIGN PATENT DOCUMENTS

| | | | |
|---|---|---|---|
| TW | 202139747 | A | 10/2021 |
| TW | 202139749 | A | 10/2021 |

(Continued)

OTHER PUBLICATIONS

Ericson, Mårten, et al. "Architecture Enablers for 6G." 6G to Build a Sustainable Future (2026): 167-215. (Year: 2026).*

(Continued)

*Primary Examiner* — Sharad Rampuria
(74) *Attorney, Agent, or Firm* — Cozen O'Connor

(57) ABSTRACT

A method for cancelling a conditional PScell change configuration or a conditional PScell addition configuration, performed by a source MN, includes: determining a related node on which the conditional PScell change configuration or the conditional PScell addition configuration is to be canceled; sending a conditional PScell change or addition cancellation message to the related node, wherein the conditional PScell change or addition cancellation message instructs the related node to initiate a cancellation process of the conditional PScell change configuration or the conditional PScell addition configuration, respectively. The related node comprises any one of: a first target SN corresponding to a PSCell or a SCG corresponding to the conditional PScell change configuration or the conditional PScell addition configuration; a target MN associated with the first target SN.

20 Claims, 4 Drawing Sheets

(56) References Cited

FOREIGN PATENT DOCUMENTS

| | | |
|---|---|---|
| WO | WO 2022060195 A1 | 3/2022 |
| WO | WO 2022064469 A1 | 3/2022 |

OTHER PUBLICATIONS

PCT/CN2022/08572 International Search Report dated Dec. 22, 2022, 2 pages.

* cited by examiner

CPC CONFIGURATION OR CPA CONFIGURATION CANCELLATION METHOD AND APPARATUS THEREOF

CROSS-REFERENCE TO RELATED APPLICATIONS

The present application is a U.S. national phase application of International Application No. PCT/CN2022/085972, filed on Apr. 8, 2022, the entire content of which is incorporated herein by reference.

FIELD

The present disclosure relates to the field of communication technologies, and more particularly to a method and apparatus for canceling a CPC (Conditional PSCell change) configuration or a CPA (Conditional PSCell addition) configuration.

BACKGROUND

In a scenario of a conditional handover (CHO) configuration with a conditional primary secondary cell (PSCell) change (CPC) configuration or a conditional PSCell addition (CPA) configuration, the issues of how to cancel the CPC configuration or the CPA configuration remain unsolved.

SUMMARY

In a first aspect, an embodiment of the present disclosure provides a method for canceling a CPC configuration or a CPA configuration, which is performed by a source master node (MN), and includes: determining a related node on which the CPC configuration or the CPA configuration is to be canceled; sending a CPC or CPA cancellation message to the related node. The CPC or CPA cancellation message instructs the related node to initiate a cancellation process of the CPC configuration or the CPA configuration, respectively. The related node includes any one of: a first target secondary node (SN) corresponding to a PSCell or a secondary cell group (SCG) corresponding to the CPC configuration or the CPA configuration; or a target MN associated with the first target SN.

In a second aspect, an embodiment of the present disclosure provides a method for canceling a CPC configuration or a CPA configuration, which is performed by a target MN, and includes: determining a first target SN on which the CPC configuration or the CPA configuration is to be canceled, in which the first target SN is a target SN corresponding to a PSCell or a secondary cell group (SCG) corresponding to the CPC configuration or the CPA configuration; sending a CPC or CPA cancellation message to the first target SN. The CPC or CPA cancellation message instructs the first target SN to initiate a cancellation process of the CPC configuration or the CPA configuration, respectively.

In a third aspect, an embodiment of the present disclosure provides a method for canceling a CPC configuration or a CPA configuration, which is performed by a second target secondary node (SN), and includes: sending a CPC or CPA cancellation message to a first target SN. The CPC or CPA cancellation message instructs the first target SN to initiate a cancellation process of the CPC configuration or the CPA configuration, respectively. The at least one first target SN is a target SN corresponding to a PSCell or a secondary cell group (SCG) corresponding to the CPC configuration or the CPA configuration, and the second target SN is a target SN selected by a terminal device for an access.

In a fourth aspect, an embodiment of the present disclosure provides a method for canceling a CPC configuration or a CPA configuration, which is performed by a source SN, and includes: determining a related node on which the CPC configuration is to be canceled; sending a CPC cancellation message to the related node. The CPC cancellation message instructs the related node to initiate a cancellation process of the CPC configuration. The related node includes any one of: a first target secondary node (SN) corresponding to a PSCell or a secondary cell group (SCG) corresponding to the CPC configuration; or a source MN associated with the source SN.

In a fifth aspect, an embodiment of the present disclosure provides a method for canceling a CPC configuration or a CPA configuration, which is performed by a first target SN, and includes: receiving a CPC or CPA cancellation message; and canceling the CPC configuration or the CPA configuration based on the CPC or CPA cancellation message, respectively. The first target SN is a target SN corresponding to a PSCell or a secondary cell group (SCG) corresponding to the CPC configuration or the CPA configuration.

In a sixth aspect, an embodiment of the present disclosure provides a communication apparatus, which has some or all of functions for implementing the source MN in the method example according to the above first aspect, some or all of functions for implementing the target MN in the method example according to the above second aspect, some or all of functions for implementing the second target SN in the method example according to the above third aspect, some or all of functions for implementing the source SN in the method example according to the above fourth aspect, some or all of functions for implementing the first target SN in the method example according to the above fifth aspect. For example, the communication apparatus may have functions as described in some or all of the embodiments in the present disclosure, and may also have functions to separately implement any of embodiments in the present disclosure. The functions may be implemented by a hardware, or may be implemented by executing a corresponding software on the hardware. The hardware or the software includes one or more elements or modules corresponding to the above functions.

In an implementation, the communication apparatus may include a transceiving module and a processing module, and the processing module is configured to support the communication apparatus to perform corresponding functions in the above method. The transceiving module is configured to support a communication between the communication apparatus and other devices. The communication apparatus may further include a storage module, which is configured to be coupled with the transceiving module and the processing module, and store necessary computer programs and data of the communication apparatus.

As an example, the processing module may be a processor, the transceiving module may be a transceiver or a communication interface, and the storage module may be a memory.

In a seventh aspect, an embodiment of the present disclosure provides a communication apparatus, which includes a processor. When the processor calls a computer program in a memory, it executes the method according to the first, second, third, fourth or fifth aspect above.

In an eighth aspect, an embodiment of the present disclosure provides a communication apparatus, which includes a processor and a memory having stored therein a computer program. The processor executes the computer program stored in the memory so that the communication apparatus executes the method according to the first, second, third, fourth or fifth aspect above.

In a ninth aspect, an embodiment of the present disclosure provides a communication apparatus, which includes a processor and an interface circuit. The interface circuit is configured to receive code instructions and transmit them to the processor, and the processor is configured to run the code instructions to enable the apparatus to execute the method according to the first, second, third, fourth or fifth aspect above.

In a tenth aspect, an embodiment of the present disclosure provides a computer-readable storage medium, which is configured to store instructions used for the above-mentioned receiving device that, when executed, cause the receiving device to perform the method according to the first, second, third, fourth or fifth aspect above.

BRIEF DESCRIPTION OF THE DRAWINGS

In order to more clearly illustrate the technical solutions in embodiments of the present disclosure or the background, drawings that need to be used in embodiments of the present disclosure or the background will be described below.

DETAILED DESCRIPTION

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the present disclosure. Instead, they are merely examples of devices and methods consistent with some aspects of the present disclosure as recited in the appended claims.

Terms used herein in embodiments of the present disclosure are only for the purpose of describing specific embodiments, but should not be construed to limit embodiments of the present disclosure. As used in embodiments of the present disclosure and the appended claims, "a/an" and "the" in singular forms are intended to include plural forms, unless clearly indicated in the context otherwise. It should also be understood that, the term "and/or" used herein represents and contains any or all possible combinations of one or more associated listed items.

It should be understood that, although terms such as "first," "second" and "third" may be used in embodiments of the present disclosure for describing various information, these information should not be limited by these terms. These terms are only used for distinguishing information of the same type from each other. For example, first information may also be referred to as second information, and similarly, the second information may also be referred to as the first information, without departing from the scope of embodiments of the present disclosure. As used herein, the term "if" may be construed to mean "when" or "upon" or "in response to determining" depending on the context.

For the purpose of brevity and ease of understanding, terms "greater than" or "less than", "higher than" or "lower than" are used herein to characterize size relationships. However, it may be understood by those skilled in the art that the term "greater than" also covers the meaning of "greater than or equal to", and "less than" also covers the meaning of "less than or equal to"; the term "higher than" covers the meaning of "higher than or equal to", and "lower than" also covers the meaning of "lower than or equal to".

For ease of understanding, terms involved in the present disclosure are first introduced.

Figure 1:
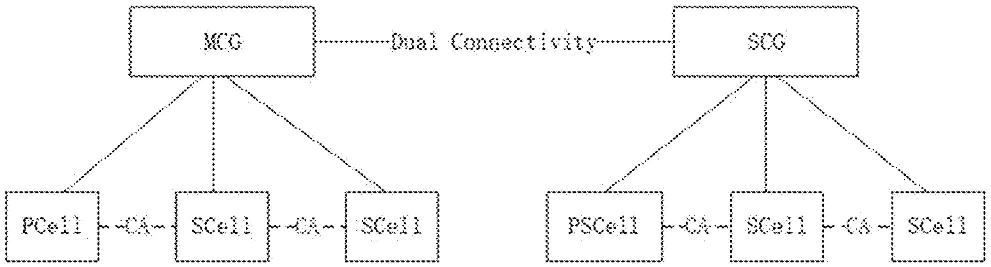
FIG. 1 is a schematic architecture diagram of a master cell group and a secondary cell group in dual connectivity provided in an embodiment of the present disclosure.

In dual connectivity, a user equipment (UE) may access two cell groups, namely a master cell group (MCG) and a secondary cell group (SCG). Under the MCG, many cells may be provided, one of which is configured to initiate an initial access, and is called a PCell. As the name suggests, the PCell is the most "main" cell in the MCG. The primary cell (PCell) under the MCG and a secondary cell (SCell) under the MCG are combined together via a carrier aggregation (CA). The MCG includes the PCell and the SCell. The SCG includes a primary secondary cell (PSCell) and a SCell. Because many signalings are only sent on the PCell and the PSCell, for the convenience of description, a concept in the protocol is also defined: a special cell (sPCell), the PCell and the PSCell are collectively referred to as the sPCell, as shown in FIG. 1.

Under multi-radio dual connectivity (MR-DC), a terminal device may utilize radio resources provided by two different schedulers, these schedulers are located on two different nodes, one as a master node (MN) and the other as a secondary node (SN). The MN and the SN are connected via a network interface, and the MN is at least connected to a core network. One PScell or SCG corresponds to one SN, and one Pcell or MCG corresponds to one MN.

In an embodiment of the present disclosure, the MN includes a source MN and a target MN. The source MN is a master node currently accessed by the terminal device, the target MN is a MN to be switched, and a CHO configuration is successfully performed on the target MN. The target MN may also be classified into a first target MN and a second target MN. The first target MN is a target MN that is not selected by the terminal device for an access, and the second target MN is a target MN that is selected by the terminal device for the access.

In an embodiment of the present disclosure, the SN includes a source SN and a target SN. The source SN is a secondary node currently accessed by the terminal device, the target SN is an SN to be changed or added, and a CPC or CPA configuration is successfully performed on the target SN. The target SN may also be classified into a first target SN and a second target SN. The first target SN is a target SN that is not selected by the terminal device for an access, and the second target SN is a target SN that is selected by the terminal device for the access.

It should be noted that in the present disclosure, a method for canceling a CPC configuration or a CPA configuration provided in any embodiment may be executed alone, or may be executed together in combination with possible implementations in other embodiments, or may be executed together in combination with any technical solution in the relevant technology.

It should be noted that the technical solutions of embodiments of the present disclosure may be applied to various communication systems, for example, a long term evolution (LTE) system, a 5th generation (5G) mobile communication system, a 5G new radio (NR) system, or other future new mobile communication systems.

The network device in embodiments of the present disclosure is an entity on a network side for sending or receiving signals. For example, the network device may be an evolved NodeB (eNB), a transmission reception point (TRP), a next generation NodeB (gNB) in a NR system, a base station in other future mobile communication systems, or an access node in a wireless fidelity (WiFi) system. The specific technology and specific device form adopted by the network device are not limited in embodiments of the present disclosure. The network device provided in embodiments of the present disclosure may be composed of a central unit (CU) and distributed units (DU). The CU may also be called a control unit. Using the CU-DU structure allows to split a protocol layer of the network device, such as the base station, so that some of functions of the protocol layer is centrally controlled in the CU, some or all of the remaining functions of the protocol layer are distributed in the DUs, and the CU centrally controls the DUs.

The terminal device in embodiments of the present disclosure is an entity on a user side for receiving or sending signals, such as a mobile phone. The terminal device may also be called a terminal, a user equipment (UE), a mobile station (MS), a mobile terminal (MT), and so on. The terminal device may be a device with a communication function, such as a car, a smart car, a mobile phone, an Internet of Things device such as an NB-IoT or an (e) MTC, a wearable device, a tablet Pad, a computer with a wireless transceiving function, a virtual reality (VR) terminal device, an augmented reality (AR) terminal device, a wireless terminal device in an industrial control, a wireless terminal device in a self-driving, a wireless terminal device in a remote medical surgery, a wireless terminal device in a smart grid, a wireless terminal device in a transportation safety, a wireless terminal device in a smart city, a wireless terminal device in a smart home, etc. The specific technology and the specific device form adopted by the terminal device are not limited in embodiments of the present disclosure.

A method and apparatus for canceling a CPC configuration or a CPA configuration provided by the present disclosure will be introduced in detail below with reference to the accompanying drawings.

Figure 2:
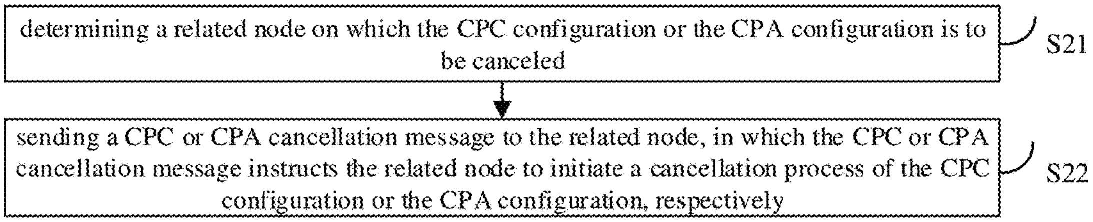
FIG. 2 is a schematic flowchart of a method for canceling a CPC configuration or a CPA configuration provided in an embodiment of the present disclosure.

Referring to FIG. 2, which is a schematic flowchart of a method for canceling a CPC configuration or a CPA configuration provided in an embodiment of the present disclosure. As shown in FIG. 2, the method is performed by a source MN and may include, but is not limited to, following steps.

In step S21, a related node on which the CPC configuration or the CPA configuration is to be canceled is determined.

In an embodiment of the present disclosure, a network side is configured with a conditional handover (CHO) configuration and also configured with the CPC configuration or the CPA configuration at the same time. That is, the network side is configured with the CPC configuration while being configured with the CHO configuration; or the network side is configured with the CPA configuration while being configured with the CHO configuration. That is, while an MN in the network is configured with the CHO configuration, an SN is configured with the CPC configuration or the CPA configuration.

It should be noted that in an embodiment of the present disclosure, the related node includes any one of: a first target secondary node (SN) corresponding to a PSCell or a secondary cell group (SCG) corresponding to the CPC configuration or the CPA configuration; a target MN associated with the first target SN.

It should be noted that the first target SN is a target SN where the PSCell or the SCG is located, in which a terminal device needs to access the PSCell or the SCG to execute the CPC configuration or the CPA configuration. In an embodiment of the present disclosure, the first target SN is another target SN that is not selected by the terminal device for an access. In order to reduce a resource occupation, the CPC configuration or the CPA configuration on the first target SN needs to be canceled.

It should be noted that a connection, namely a network interface, exists between the MN and the SN, and the associated MN and SN may respectively provide a dual-connected primary secondary cell group for the terminal device. That is, in an embodiment of the present disclosure, a connection, namely a network interface, exists between the first target SN and its associated target MN.

In some embodiments, one source MN may correspond to at least one target MN, one target MN may be associated with at least one target SN, and the target SNs associated with multiple different target MNs may be the same or different.

In an embodiment of the present disclosure, optionally, canceling the CPA configuration or the CPC configuration is to cancel a resource reserved by the first target SN for the terminal device.

In some embodiments, the source MN needs to initiate a cancellation of the CPC configuration or the CPA configuration in one of following situations.

In some implementations, the source MN initiates a cancellation of the CPC configuration or the CPA configuration for the SN that is not accessed by the terminal device. That is, after determining a second target MN and a second target SN that are selected by the terminal device for the access, the cancellation of the CPC configuration or the CPA configuration may be initiated for the first SN that is not selected by the terminal device for the access.

In some other implementations, the source MN initiates a cancellation of the CPC configuration or the CPA configuration for some specified SNs. For example, the specified SN may be an SN that is not suitable for being accessed by the terminal device. Before determining a second target MN and a second target SN that are selected by the terminal device for the access, the cancellation of the CPC configuration or the CPA configuration is initiated for a target SN that is configured with the CPC configuration or the CPA configuration but is not suitable for being accessed by the terminal device. In this case, the target SN that is configured with the CPC configuration or the CPA configuration but is not suitable for being accessed by the terminal device is the first target SN.

In some other implementations, the source MN initiates a cancellation of the CPC configuration or the CPA configuration for SNs associated with some specified target MNs. For example, when all or some of the SNs associated with the specified target MNs are SNs that are not suitable for being accessed by the terminal device or the source MN cancels all CPC configurations or CPA configurations associated with the specified target MNs, before determining a second target MN and a second target SN that are selected by the terminal device for the access, the source MN sends CPC or CPA cancellation information to the specified target MNs, and the specified target MNs forward the cancellation information to initiate the cancellation of the CPC configuration or the CPA configuration. That is, the source MN sends to certain target MNs to tell them to cancel all or some of the CPC or CPA configurations associated with them.

In some other implementations, the source MN initiates a cancellation of the CPC configuration or the CPA configuration for all target MNs. For example, when the source MN needs to cancel all CPC configurations or CPA configurations, before determining a second target MN and a second target SN that are selected by the terminal device for the access, the source MN sends CPC or CPA cancellation information to all target MNs, and the target MNs forward the cancellation information to initiate the cancellation of the CPC configuration or the CPA configuration. That is, the source MN determines that the terminal device does not perform a CPC or a CPA.

In step S22, a CPC or CPA cancellation message is sent to the related node, in which the CPC or CPA cancellation message instructs the related node to initiate a cancellation process of the CPC configuration or the CPA configuration, respectively.

In some implementations, the related node is the first target SN, and the source MN sends the CPC or CPA cancellation message to at least one first target SN. For example, the source MN may send the CPC or CPA cancellation message to all first target SNs that are configured with the CPC or the CPA for this terminal device but are not selected for the access, or to at least one first target SN instructed that is configured with the CPC or the CPA for this terminal device but is not selected for the access.

In some other implementations, the related node is a target MN associated with the first target SN, and the source MN sends the CPC or CPA cancellation message to at least one target MN. The CPC or CPA cancellation message instructs the target MN to cancel the CPC configuration or the CPA configuration on at least one first target SN. That is, the target MN forwards the CPC or CPA cancellation message to the at least one first target SN based on the CPC or CPA cancellation message to release a resource reserved for the terminal device in the first target SNs. In some embodiments, the target MN may be a first target MN that is not selected by the terminal device for the access, or may be a second target MN that is accessed by the terminal device.

An embodiment of the present disclosure provides the method for canceling the CPC configuration or the CPA configuration. In a scenario where a network side has the CHO configuration and also has the CPC configuration or the CPA configuration, the source MN may determine the related node on which the CPC configuration or the CPA configuration is to be canceled, and send the CPC or CPA cancellation message to the related node. A CPC/CPA configuration on a corresponding node of a cell that is not selected by the terminal device for the access may be canceled, thereby releasing a resource reserved in the node.

Figure 3:
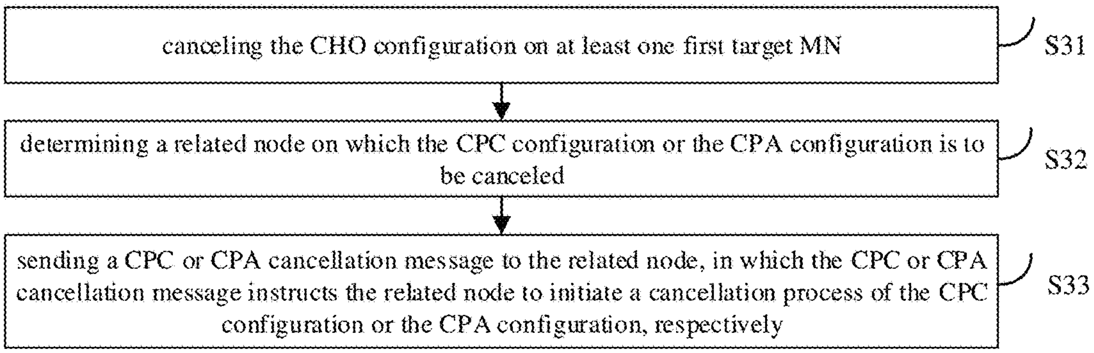
FIG. 3 is a schematic flowchart of a method for canceling a CPC configuration or a CPA configuration provided in an embodiment of the present disclosure.

Referring to FIG. 3, which is a schematic flowchart of a method for canceling a CPC configuration or a CPA configuration provided in an embodiment of the present disclosure. As shown in FIG. 3, the method is performed by a source MN and may include, but is not limited to, following steps.

In step S31, the CHO configuration on at least one first target MN is canceled.

In an embodiment of the present disclosure, a network side is configured with the conditional handover (CHO) configuration and also configured with the CPC configuration or the CPA configuration at the same time. That is, the network side is configured with the CPC configuration while being configured with the CHO configuration; or the network side is configured with the CPA configuration while being configured with the CHO configuration. That is, while the MN in the network is configured with the CHO configuration, an SN is configured with the CPC configuration or the CPA configuration.

The first target MN is a target MN that is not selected by the terminal for an access.

In some embodiments, a CHO cancellation message is sent to the at least one first target MN, for example, all first target MNs that are not selected by a terminal device for the access. The CHO cancellation message is used to instruct the first target MN to cancel the CHO configuration to release a resource reserved for a terminal device.

In step S32, a related node on which the CPC configuration or the CPA configuration is to be canceled is determined.

In an embodiment of the present disclosure, the related node includes any one of: a first target secondary node (SN) corresponding to a PSCell or a secondary cell group (SCG) corresponding to the CPC configuration or the CPA configuration; a target MN associated with the first target SN.

In step S33, a CPC or CPA cancellation message is sent to the related node, in which the CPC or CPA cancellation message instructs the related node to initiate a cancellation process of the CPC configuration or the CPA configuration, respectively.

For specific implementation manners of the steps S32 to S33, reference may be made to the relevant contents in the above embodiments, which will not be repeated here.

An embodiment of the present disclosure provides the method for canceling the CPC configuration or the CPA configuration. In a scenario where a network side has the CHO configuration and also has the CPC configuration or the CPA configuration, the source MN may determine the related node on which the CPC configuration or the CPA configuration is to be canceled, and send the CPC or CPA cancellation message to the related node. A CPC/CPA configuration on a corresponding node of a cell that is not selected by the terminal device for the access may be canceled, thereby releasing a resource reserved in the node.

Figure 4:
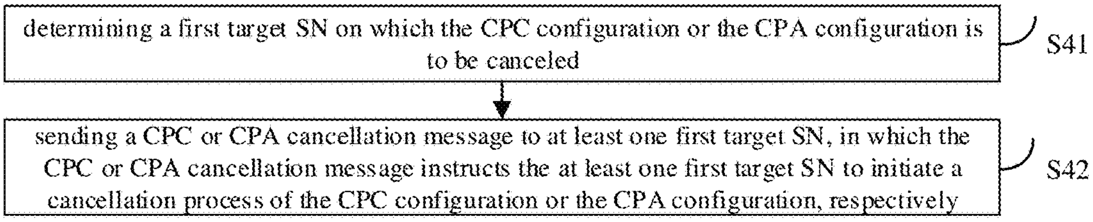
FIG. 4 is a schematic flowchart of a method for canceling a CPC configuration or a CPA configuration provided in an embodiment of the present disclosure.

Referring to FIG. 4, which is a schematic flowchart of a method for canceling a CPC configuration or a CPA configuration provided in an embodiment of the present disclosure. As shown in FIG. 4, the method is performed by a target MN and may include, but is not limited to, following steps.

In step S41, a first target SN on which the CPC configuration or the CPA configuration is to be canceled is determined.

In an embodiment of the present disclosure, a network side is configured with a conditional handover (CHO) configuration and also configured with the CPC configuration or the CPA configuration at the same time. That is, the network side is configured with the CPC configuration while being configured with the CHO configuration; or the network side is configured with the CPA configuration while being configured with the CHO configuration. That is, while an MN in the network is configured with the CHO configuration, an SN is configured with the CPC configuration or the CPA configuration.

It should be noted that the first target SN is a target SN corresponding to a PSCell or a secondary cell group (SCG) corresponding to the CPC configuration or the CPA configuration. That is, the first target SN is a target SN where the PSCell or the SCG is located, in which a terminal device needs to access the PSCell or the SCG to execute the CPC configuration or the CPA configuration. The first target SN is another target SN that is not selected by the terminal device for an access. In order to reduce a resource occupation, the CPC configuration or the CPA configuration on the first target SN needs to be canceled.

The target MN may initiate a cancellation of the CPC configuration or the CPA configuration in one of following situations.

The target MN initiates the cancellation of the CPC configuration or the CPA configuration on its own initiative.

The target MN receives the CHO cancellation message sent by a source MN.

The target MN receives a cancellation message sent by a source MN to cancel the CPA configuration or the CPC configuration on the target MN.

In some implementations, the target MN actively sends a CPC or CPA cancellation message to at least one first target SN.

In some further implementations, the target MN receives the CHO cancellation message sent by the source MN, and sends a CPC or CPA cancellation message to the at least one first target SN based on the CHO cancellation message.

In some other implementations, the target MN receives the cancellation message sent by the source MN to cancel the CPA configuration or the CPC configuration on the target MN, and sends a CPC or CPA cancellation message to the at least one first target SN.

In step S42, a CPC or CPA cancellation message is sent to at least one first target SN, in which the CPC or CPA cancellation message instructs the at least one first target SN to initiate a cancellation process of the CPC configuration or the CPA configuration, respectively.

In some embodiments, the target MN is a first target MN that is not selected by a terminal device for an access; or a second target MN that is selected by a terminal device for an access.

In response to the target MN being the first target MN, the first target MN may receive a CHO cancellation message sent by a source MN, and cancel the CHO configuration on the first target MN based on the CHO cancellation message, that is, release a resource reserved by the first target MN for the terminal device. In an embodiment of the present disclosure, the first target MN sends the CPC or CPA cancellation message to at least one first target SN, that is, releases a resource reserved by the first target SN for the terminal device.

In response to the target MN being the second target MN, the second target MN may send the CPC or CPA cancellation message to all or some of the at least one first target SN. In some embodiments, the second target MN sends the CPC or CPA cancellation message to at least one first target SN that is associated with the second target MN.

In some other implementations, after receiving the cancellation message sent by the source node, the target MN sends the CPC or CPA cancellation message to the first target SN. For example, in response to the target MN being the first target MN, the target MN receives a CHO cancellation message sent by a source node, and sends the CPC or CPA cancellation message to all or some of the at least one first target SN that is associated with the target MN. For another example, the target MN receives the CPC or CPA cancellation message sent by a source node, and sends the CPC or CPA cancellation message to the at least one first target SN that is instructed. For yet another example, the target MN receives the CPC or CPA cancellation message sent by a source node, and sends the CPC or CPA cancellation message to all or some of the at least one first target SN that is associated with the target MN.

It should be noted that the source node may be a source SN or the source MN. The source MN or the source SN may directly send the cancellation message to the target MN. Alternatively, the source SN may send the cancellation message to the source MN, and the source MN forwards the cancellation message.

An embodiment of the present disclosure provides the method for canceling the CPC configuration or the CPA configuration. The target MN determines the first target SN on which the CPC configuration or the CPA configuration is to be canceled, and sends the cancellation message to the first target SN. A CPC/CPA configuration on a corresponding node of a cell that is not selected by the terminal device for the access may be canceled, thereby releasing a resource reserved in the node.

Figure 5:
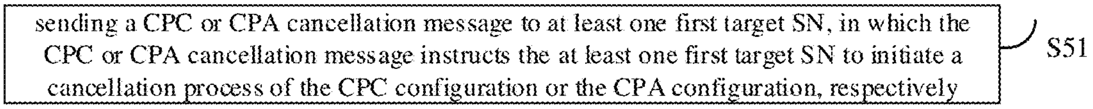
FIG. 5 is a schematic flowchart of a method for canceling a CPC configuration or a CPA configuration provided in an embodiment of the present disclosure.

Referring to FIG. 5, which is a schematic flowchart of a method for canceling a CPC configuration or a CPA configuration provided in an embodiment of the present disclosure. As shown in FIG. 5, the method is performed by a second target SN and may include, but is not limited to, following steps.

In step S51, a CPC or CPA cancellation message is sent to at least one first target SN, in which the CPC or CPA cancellation message instructs the at least one first target SN to initiate a cancellation process of the CPC configuration or the CPA configuration, respectively.

In an embodiment of the present disclosure, a network side is configured with a conditional handover (CHO) configuration and also configured with the CPC configuration or the CPA configuration at the same time. That is, the network side is configured with the CPC configuration while being configured with the CHO configuration; or the network side is configured with the CPA configuration while being configured with the CHO configuration. That is, while an MN in the network is configured with the CHO configuration, an SN is configured with the CPC configuration or the CPA configuration.

It should be noted that the first target SN is a target SN corresponding to a PSCell or a secondary cell group (SCG) corresponding to the CPC configuration or the CPA configuration. That is, the first target SN is a target SN where the PSCell or the SCG is located, in which a terminal device needs to access the PSCell or the SCG to execute the CPC configuration or the CPA configuration. The first target SN is another target SN that is not selected by the terminal device for an access. In order to reduce a resource occupation, the CPC configuration or the CPA configuration on the first target SN needs to be canceled.

The second target SN is a target SN selected by a terminal device for an access. In an embodiment of the present disclosure, after completing a cell handover of the terminal device, the second target SN may receive an SN reconfiguration completion message. At this time, the CPC or CPA cancellation message may be sent to the at least one first target SN to instruct the at least one first target SN to release a resource reserved for the terminal device.

An embodiment of the present disclosure provides the method for canceling the CPC configuration or the CPA configuration. By sending the cancellation message from the second target SN to the first target SN, a CPC/CPA configuration on a corresponding node of a cell that is not selected by the terminal device for the access may be canceled, thereby releasing a resource reserved in the node.

Figure 6:
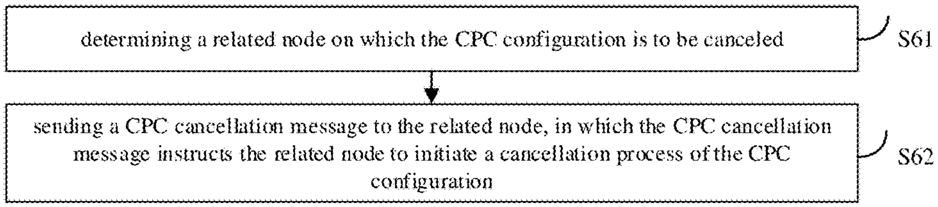
FIG. 6 is a schematic flowchart of a method for canceling a CPC configuration or a CPA configuration provided in an embodiment of the present disclosure.

Referring to FIG. 6, which is a schematic flowchart of a method for canceling a CPC configuration or a CPA configuration provided in an embodiment of the present disclosure. As shown in FIG. 6, the method is performed by a source SN and may include, but is not limited to, following steps.

In step S61, a related node on which the CPC configuration is to be canceled is determined.

In an embodiment of the present disclosure, a network side is configured with a conditional handover (CHO) configuration, and also configured with a CPC configuration at the same time. That is, the network side is configured with the CPC configuration while being configured with the CHO configuration. That is, while an MN in a network is configured with the CHO configuration, an SN is configured with the CPC configuration.

It should be noted that in an embodiment of the present disclosure, the related node includes any one of: a first target secondary node (SN) corresponding to a PSCell or a secondary cell group (SCG) corresponding to the CPC configuration; a source MN associated with the source SN.

It should be noted that the first target SN is a target SN where the PSCell or the SCG is located, in which a terminal device needs to access the PSCell or the SCG to execute the CPC configuration. In an embodiment of the present disclosure, the first target SN is another target SN that is not selected by the terminal device for an access. In order to reduce a resource occupation, the CPC configuration on the first target SN needs to be canceled.

It should be noted that a connection, namely a network interface, exists between the MN and the SN, and the associated MN and SN may respectively provide a dual-connected primary secondary cell group for the terminal device. That is, in an embodiment of the present disclosure, a connection, namely a network interface, exists between the source SN and its associated source MN.

In some embodiments, the source SN needs to initiate a cancellation of the CPC configuration in one of following situations.

In some implementations, the source SN initiates a cancellation of the CPC configuration for the SN that is not accessed by the terminal device. That is, after determining a second target MN and a second target SN that are selected by the terminal device for the access, the cancellation of the CPC configuration may be initiated for the first SN that is not selected by the terminal device for the access.

In some other implementations, the source SN initiates a cancellation of the CPC configuration for some specified SNs. For example, the specified SN may be an SN that is not suitable for being accessed by the terminal device. Before determining a second target MN and a second target SN that are selected by the terminal device for the access, the cancellation of the CPC configuration is initiated for a target SN that is configured with the CPC configuration but is not suitable for being accessed by the terminal device. In this case, the target SN that is configured with the CPC configuration but is not suitable for being accessed by the terminal device is the first target SN.

In step S62, a CPC cancellation message is sent to the related node, in which the CPC cancellation message instructs the related node to initiate a cancellation process of the CPC configuration.

In some implementations, the source SN receives an SN release message sent by the source MN, and sends CPC cancellation information to the related node.

In some other implementations, in response to the related node being the source MN, the CPC cancellation message is sent to the source MN, and the CPC cancellation message is sent by the source MN to at least one first target SN that is instructed or a target MN associated with a target SN. Alternatively, in response to the related node being the first target SN, the CPC cancellation message is sent to at least one first target SN that is instructed.

An embodiment of the present disclosure provides the method for canceling the CPC configuration or the CPA configuration. The source SN determines the related node on which the CPC configuration is to be canceled and sends the cancellation message to the related node. A CPC configuration on a corresponding node of a cell that is not selected by the terminal device for the access may be canceled, thereby releasing a resource reserved in the node.

Figure 7:
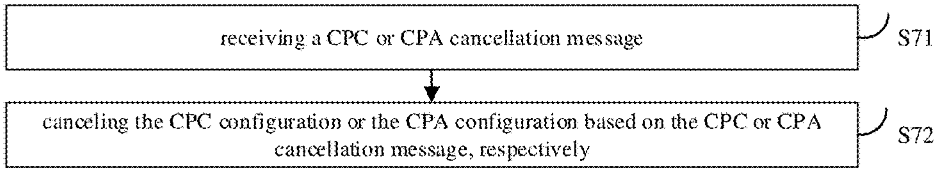
FIG. 7 is a schematic flowchart of a method for canceling a CPC configuration or a CPA configuration provided in an embodiment of the present disclosure.

Referring to FIG. 7, which is a schematic flowchart of a method for canceling a CPC configuration or a CPA configuration provided in an embodiment of the present disclosure. As shown in FIG. 7, the method is performed by a first target SN and may include, but is not limited to, following steps.

In step S71, a CPC or CPA cancellation message is received.

The first target SN may receive the CPC or CPA cancellation message sent by a source MN, or receive the CPC or CPA cancellation message sent by a source SN, or receive the CPC or CPA cancellation message sent by a target MN, or receive the CPC or CPA cancellation message sent by a second target SN.

It should be noted that the first target SN is a target SN where a PSCell or an SCG is located, in which a terminal device needs to access the PSCell or the SCG to execute the CPC configuration or the CPA configuration. In an embodiment of the present disclosure, the first target SN is another target SN that is not selected by the terminal device for an access. In order to reduce a resource occupation, the CPC configuration or the CPA configuration on the first target SN needs to be canceled.

The target MN is a first target MN that is not selected by the terminal device for the access, or a second target MN that is selected by the terminal device for the access.

In step S72, the CPC configuration or the CPA configuration is canceled based on the CPC or CPA cancellation message, respectively.

The first target SN initiates a cancellation process of the CPC configuration or the CPA configuration based on the CPC or CPA cancellation message, respectively, to release a resource reserved by the first target SN for the terminal device.

An embodiment of the present disclosure provides the method for canceling the CPC configuration or the CPA configuration. By receiving the cancellation message, the first target SN may cancel its own CPC/CPA configuration to release a resource reserved in the node to reduce a resource occupation.

Figure 8:
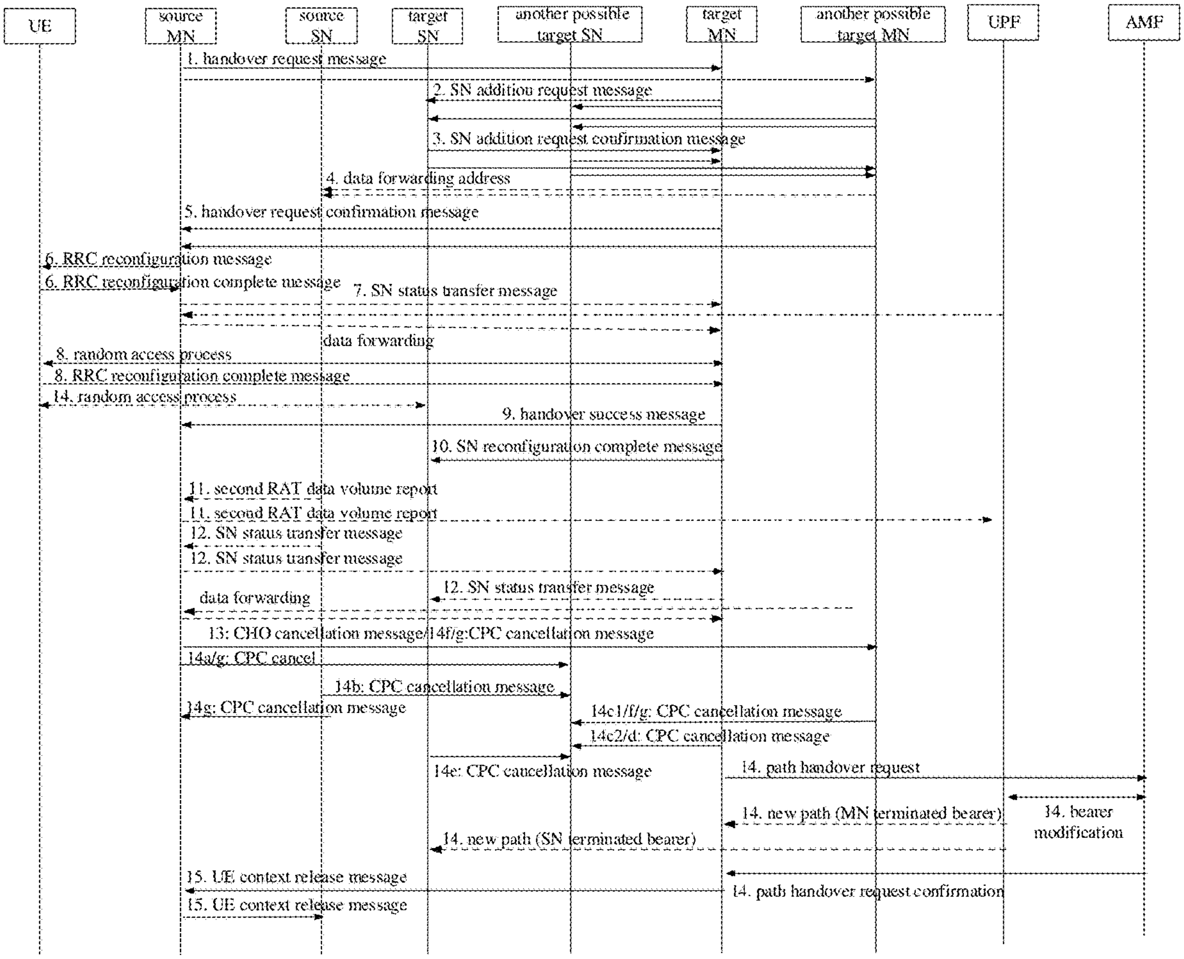
FIG. 8 is a schematic flowchart of a method for canceling a CPC configuration or a CPA configuration provided in an embodiment of the present disclosure.

Referring to FIG. 8, which is a schematic flowchart of a method for canceling a CPC configuration or a CPA configuration provided in an embodiment of the present disclosure. As shown in FIG. 8, the method is a method for canceling the CPC configuration when a CHO configuration and the CPC configuration are configured at the same time in actual situations, and may include, but is not limited to, following steps.

The following steps may be performed independently or in combination, and may be performed in an order described or in other orders, which is not limited in this embodiment.

In step 1, a source MN sends a handover request message to a target MN.

In step 2, the target MN sends an SN addition request message to a target SN.

In step 3, the target SN sends an SN addition request confirmation message to the target MN.

In step 4, optionally, the target MN may send a data forwarding address to a source SN for data forwarding.

In step 5, the target MN sends a handover request confirmation message to the source MN.

In step 6, the source MN sends a radio resource control (RRC) reconfiguration message to a UE to configure the UE to change an MN and an SN. The UE replies to the source MN with an RRC reconfiguration complete message.

In step 7, optionally, the source MN sends an SN status transfer message to the target MN for the data forwarding.

An execution order of the step 6 and the step 8 is not specified.

In step 8, the UE performs a change of the MN and the SN based on a network configuration, determines a target SN and a target MN to be connected, initiates a random access to the target MN to be connected, and sends the RRC reconfiguration complete message.

In some embodiments, the source MN notifies the source SN to stop providing data to the UE, and optionally provides an address of the target SN to start the data forwarding.

In some embodiments, the UE initiates a random access to the target SN to be connected.

In step 9, a target MN to which the UE successfully accesses sends a handover success message to the source MN.

In step 10, the target MN sends the SN reconfiguration complete message to the target SN.

In step 11, optionally, the source SN sends a second radio access technology (RAT) data volume report to the source MN, and the source MN sends the second RAT data volume report to a mobility management entity (MME) or an access and mobility management function (AMF) to report a second RAT data volume to a core network.

In step 12, optionally, the source SN sends an SN status transfer message to the source MN, and the source MN sends the SN status transfer message to the target MN for the data forwarding.

In step 13, the source MN sends a handover cancellation message to other target MNs to release resources reserved in the MNs and cancel the CHO configuration.

In step 14, the CPC configurations on other SNs are canceled.

In step 14*a*, the source MN sends a cancellation message to other SNs to cancel the CPC configuration.

In step 14*b*, the source SN sends a cancellation message to other SNs to cancel the CPC configuration.

In step 14*c*, a target MN that receives the handover cancellation message sends a cancellation message to an associated SN to cancel the CPC configuration; or the target MN sends a cancellation message to its associated unselected SN to cancel the CPC configuration.

In step 14*d*, the target MN sends a cancellation message to other SNs to cancel the CPC configuration.

In step 14*e*, the target SN sends a cancellation message to other SNs to cancel the CPC configuration.

In step 14*f*, the source MN sends a cancellation message to a corresponding target MN, and a target MN that receives a CPC cancellation message sent by the source MN sends the cancellation message to a corresponding SN to cancel the CPC configuration.

In step 14*g*, the source SN sends a cancellation message to the source MN, and in a manner similar to step 14*a* or 14*f*, the source MN forwards the cancellation message sent by the source SN.

The steps 14*a* to 14*g* are different implementations of the step 14, and the above implementations may be used in combination or independently.

In step 15, the target MN triggers a protocol data unit (PDU) session path handover process.

The target MN sends a path handover request message to the MME or the AMF, and path handover and a corresponding user plane update are performed between the MME and a signaling gateway (S-GW) or between a user plane function (UPF) and the AMF. If it is successful, the MME or the AMF replies to the target MN with a path handover request confirmation message, otherwise, replies with a path handover request failure message.

In step 16, the target MN sends a UE context release message to the source MN, and the source MN sends the UE context release message to the source SN, triggering a source node to release a UE context.

Figure 9:
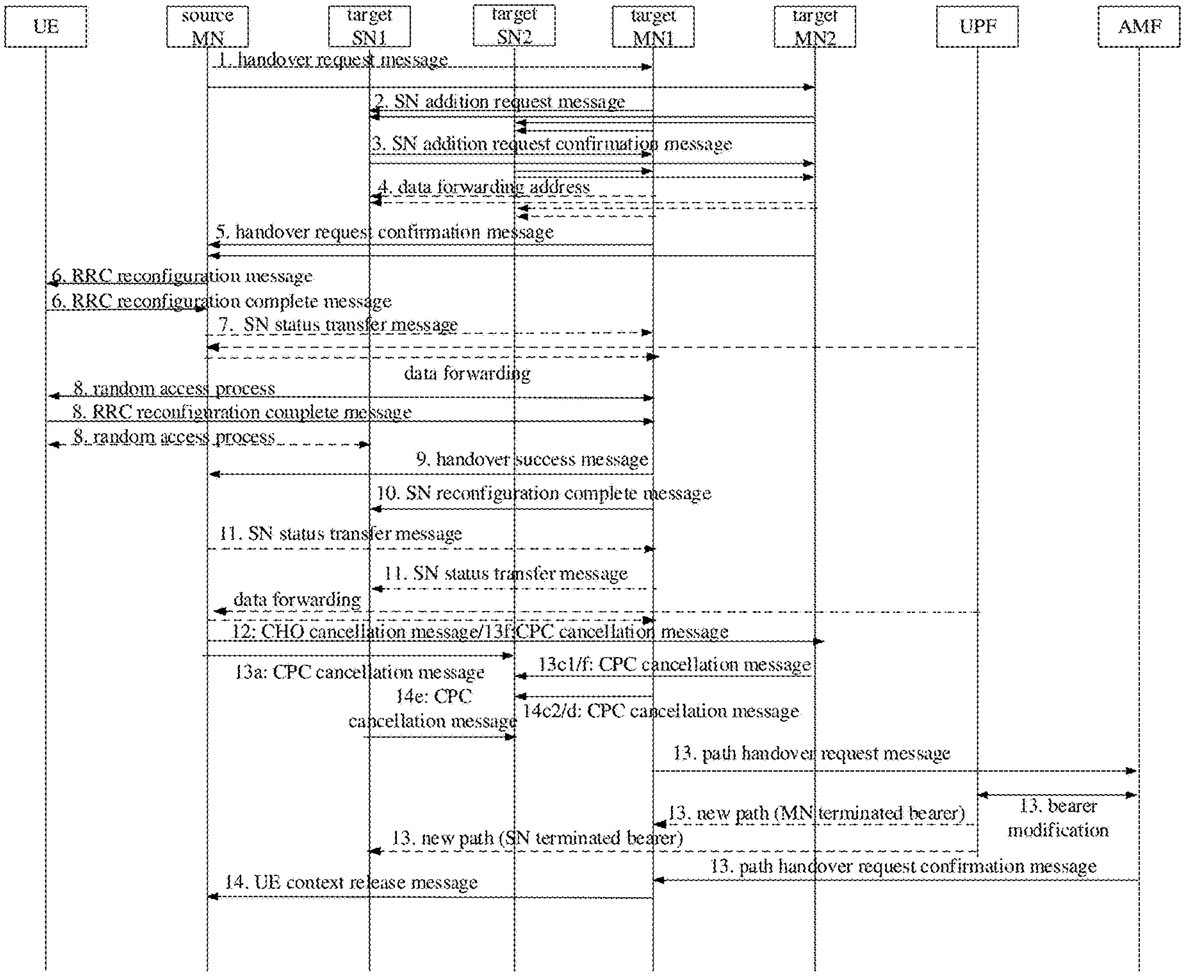
FIG. 9 is a schematic flowchart of a method for canceling a CPC configuration or a CPA configuration provided in an embodiment of the present disclosure.

Referring to FIG. 9, which is a schematic flowchart of a method for canceling a CPC configuration or a CPA configuration provided in an embodiment of the present disclosure. As shown in FIG. 9, the method is a method for canceling the CPA configuration when a CHO configuration and the CPA configuration are configured at the same time in actual situations, and may include, but is not limited to, following steps.

The following steps may be performed independently or in combination, and may be performed in an order described or in other orders, which is not limited in this embodiment.

In step 1, a source MN sends a handover request message to a target MN.

At least one target MN may be provided, that is, the source MN may send the handover request message to multiple target MNs.

The handover request message is used to request a receiving end node to prepare a resource for a handover.

The target MN may perform an admission control to determine whether a corresponding resource may be prepared, and determine an MCG according to the handover request message or based on an implementation.

In case that the target MN determines that the corresponding resource may be prepared, subsequent steps are performed. Otherwise, a handover preparation failure message is sent to the source MN. This message is used to notify the receiving end node that a handover preparation fails.

In step 2, the target MN sends an SN addition request message to a target SN.

At least one target SN may be provided, that is, the target MN may send the SN addition request message to multiple target SNs.

The SN addition request message is used to request a receiving end node to prepare a resource for a DC operation.

The target SN may perform an admission control to determine whether a corresponding resource may be prepared, and determine an SCG according to the SN addition request message or based on an implementation.

In case that the target SN determines that the corresponding resource may be prepared, subsequent steps are performed. Otherwise, an SN addition request rejection message is sent to the target MN. This message is used to notify the receiving end node that an SN addition preparation fails.

In step 3, the target SN sends an SN addition request confirmation message to the target MN.

The SN addition request confirmation message may be used to confirm to a receiving end MN that the target SN has completed the SN addition preparation.

In some embodiments, the target MN determines whether a corresponding SN that may prepare a corresponding resource exists according to a received SN addition request confirmation message. If the corresponding SN that may prepare the corresponding resource exists, subsequent steps are performed. Otherwise, a handover preparation failure message is sent to the source MN. This message is used to notify the receiving end node that a handover preparation fails.

In step 4, optionally, the target MN may provide a data forwarding address to the target SN for data forwarding.

In step 5, the target MN sends a handover request confirmation message to the source MN.

The handover request confirmation message notifies the receiving end node of a resource that has been prepared on the target SN.

The source MN may receive handover request confirmation messages from multiple target MNs.

In step 6, the source MN sends an RRC reconfiguration message to a UE to configure the UE to change an MN and an SN. The UE replies to the source MN with an RRC reconfiguration complete message.

If the UE cannot perform a configuration in the RRC reconfiguration message, an RRC reconfiguration failure process is performed.

In step 7, optionally, the source MN sends an SN status transfer message to the target MN for the data forwarding.

An execution order of the step 6 and the step 7 is not specified.

In step 8, the UE performs a change of the MN and the SN based on a network configuration, determines a target SN and a target MN to be connected, initiates a random access to the target MN to be connected, and sends the RRC reconfiguration complete message.

In some embodiments, the UE initiates a random access to the target SN to be connected.

In step 9, a target MN to which the UE successfully accesses sends a handover success message to the source MN.

In step 10, the target MN sends the SN reconfiguration complete message to the target SN.

In step 11, optionally, the source MN sends the SN status transfer message to the target MN, and the target MN sends the SN status transfer message to the target SN for the data forwarding.

In step 12, the source MN sends a handover cancellation message to other target MNs to release resources reserved in the MNs and cancel the CHO configuration.

In step 13, the CPA configurations on other SNs are canceled.

In step 13*a*, the source MN sends a cancellation message to other SNs to cancel the CPA configuration.

In step 13*c*, an MN that receives the handover cancellation message sends a cancellation message to an associated SN to cancel the CPA configuration; or the target MN sends a cancellation message to its associated unselected SN to cancel the CPA configuration.

In step 13*d*, the target MN sends a cancellation message to other SNs to cancel the CPA configuration.

In step 13*e*, the target SN sends a cancellation message to other SNs to cancel the CPA configuration.

In step 13*f*, the source MN sends a cancellation message to a corresponding target MN, and a target MN that receives a CPA cancellation message sent by the source MN sends the cancellation message to a corresponding SN to cancel the CPA configuration.

The steps 13*a* to 13*f* are different implementations of the step 13, and the above implementations may be used in combination or independently.

In step 14, the target MN triggers a PDU session path handover process.

The target MN sends a path handover request message to the MME or the AMF, and path handover and a corresponding user plane update are performed between the MME and an S-GW or between a UPF and the AMF. If it is successful, the MME or the AMF replies to the target MN with a path handover request confirmation message, otherwise, replies with a path handover request failure message.

In step 15, the target MN sends a UE context release message to the source MN, triggering a source node to release a UE context.

In the above embodiments provided by the present disclosure, the methods provided in embodiments of the present disclosure are introduced from perspectives of the source MN, the target MN, the second target SN, the source SN, and the first target SN respectively. In order to implement the various functions in the methods provided in the above embodiments of the present disclosure, the source MN, the target MN, the second target SN, the source SN, and the first target SN may include a hardware structure and a software module, and implement the above functions in a form of the hardware structure, the software module, or the hardware structure plus the software module. A certain function among the above-mentioned functions may be implemented in the form of the hardware structure, the software module, or the hardware structure plus the software module.

Figure 10:
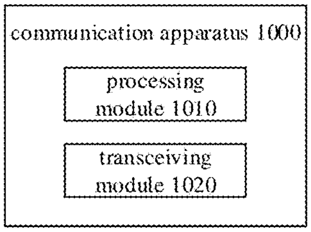
FIG. 10 is a schematic block diagram of a communication apparatus provided in an embodiment of the present disclosure.

Referring to FIG. 10, which is a schematic block diagram of a communication apparatus 1000 provided in embodiments of the present disclosure, the communication apparatus 1000 shown in FIG. 10 includes a processing module 1010 and a transceiving module 1020. The transceiving module 1020 may include a sending module and/or a receiving module, the sending module is configured to implement a sending function, and the receiving module is configured to implement a receiving function. The transceiving module 1020 may implement the sending function and/or the receiving function.

The communication apparatus 1000 may be a source MN, or an apparatus in the source MN, or an apparatus that can be used in conjunction with the source MN. Alternatively, the communication apparatus 1000 may be a target MN, or an apparatus in the target MN, or an apparatus that can be used in conjunction with the target MN. Alternatively, the communication apparatus 1000 may be a second target SN, or an apparatus in the second target SN, or an apparatus that can be used in conjunction with the second target SN. Alternatively, the communication apparatus 1000 may be a source SN, or an apparatus in the source SN, or an apparatus that can be used in conjunction with the source SN. Alternatively, the communication apparatus 1000 may be a first target SN, or an apparatus in the first target SN, or an apparatus that can be used in conjunction with the first target SN.

The communication apparatus 1000 is a source MN, and includes: a processing module 1010 configured to initiate a cancellation of a CPC configuration or a CPA configuration and determine a related node on which the CPC configuration or the CPA configuration is to be canceled; and a transceiving module 1020 configured to send a CPC or CPA cancellation message to the related node, in which the CPC or CPA cancellation message instructs the related node to initiate a cancellation process of the CPC configuration or the CPA configuration, respectively.

The related node includes any one of: a first target secondary node (SN) corresponding to a PSCell or a secondary cell group (SCG) corresponding to the CPC configuration or the CPA configuration; or a target MN associated with the first target SN.

In some embodiments, the first target SN is a target SN where the PSCell or the SCG is located, in which a terminal device needs to access the PSCell or the SCG to execute the CPC configuration or the CPA configuration.

In some embodiments, the processing module 1010 is further configured to cancel a resource reserved by the first target SN for a terminal device.

In some embodiments, a network side is configured with a conditional handover (CHO) configuration and is also configured with the CPC configuration or the CPA configuration at the same time.

In some embodiments, the processing module 1010 is further configured to cancel the CHO configuration on at least one first target MN. The at least one first target MN is a target MN that is not selected by the terminal for an access.

In some embodiments, the transceiving module 1020 is further configured to send a CHO cancellation message to the at least one first target MN. The CHO cancellation message is used to instruct the first target MN to cancel the CHO configuration to release a resource reserved for a terminal device.

In some embodiments, the transceiving module 1020 is further configured to send the CPC or CPA cancellation message to at least one first target SN.

In some embodiments, the transceiving module 1020 is further configured to send the CPC or CPA cancellation message to at least one target MN. The CPC or CPA cancellation message instructs the at least one target MN to cancel the CPC configuration or the CPA configuration on at least one first target SN.

The communication apparatus 1000 is a target MN, and includes: a processing module 1010 configured to initiate a cancellation of a CPC configuration or a CPA configuration, and determine a first target SN on which the CPC configuration or the CPA configuration is to be canceled, in which the first target SN is a target SN corresponding to a PSCell or a secondary cell group (SCG) corresponding to the CPC configuration or the CPA configuration; and a transceiving module 1020 configured to send a CPC or CPA cancellation message to at least one first target SN, in which the CPC or CPA cancellation message instructs the at least one first target SN to initiate a cancellation process of the CPC configuration or the CPA configuration, respectively.

In some embodiments, the target MN is a first target MN that is not selected by a terminal device for an access; or a second target MN that is selected by a terminal device for an access.

In some embodiments, the processing module 1010 is further configured to cancel a CHO configuration on the first target MN in response to the target MN being the first target MN.

In some embodiments, the transceiving module 1020 is further configured to receive a CHO cancellation message sent by a source MN, and cancel the CHO configuration based on the CHO cancellation message to release a resource reserved for the terminal device.

In some embodiments, the transceiving module 1020 is further configured to send the CPC or CPA cancellation message to at least one first target SN associated with the target MN; or send the CPC or CPA cancellation message to all or some of the at least one first target SN in response to the target MN being the second target MN.

In some embodiments, the transceiving module 1020 is further configured to receive a CHO cancellation message sent by a source node, and send the CPC or CPA cancellation message to all or some of the at least one first target SN that is associated; or receive the CPC or CPA cancellation message sent by a source node, and send the CPC or CPA cancellation message to the at least one first target SN that is instructed; or receive the CPC or CPA cancellation message sent by a source node, and send the CPC or CPA cancellation message to all or some of the at least one first target SN that is associated.

The communication apparatus 1000 is a second target SN, and includes: a transceiving module 1020 configured to send a CPC or CPA cancellation message to at least one first target SN, in which the CPC or CPA cancellation message instructs the at least one first target SN to initiate a cancellation process of the CPC configuration or the CPA configuration, respectively.

In some embodiments, the transceiving module 1020 is further configured to receive an SN reconfiguration complete message, and send the CPC or CPA cancellation message to the at least one first target SN.

The communication apparatus 1000 is a source SN, and includes: a processing module 1010 configured to initiate a cancellation of a CPC configuration and determine a related node on which the CPC configuration is to be canceled; and a transceiving module 1020 configured to send a CPC cancellation message to the related node, in which the CPC cancellation instructs the related node to initiate a cancellation process of the CPC configuration.

In some embodiments, the transceiving module 1020 is further configured to receive an SN release message sent by the source MN, and send CPC cancellation information to the related node.

In some embodiments, the transceiving module 1020 is further configured to send the CPC cancellation message to the source MN in response to the related node being the source MN, in which the CPC cancellation message is sent by the source MN to at least one first target SN that is instructed; or send the CPC cancellation message to at least one first target SN that is instructed in response to the related node being the first target SN.

The communication apparatus 1000 is a first target SN, and includes: a transceiving module 1020 configured to receive a CPC or CPA cancellation message; and a processing module 1010 configured to cancel the CPC configuration or the CPA configuration based on the CPC or CPA cancellation message, respectively.

In some embodiments, the transceiving module 1020 is further configured to receive the CPC or CPA cancellation message sent by a source MN; or receive the CPC or CPA cancellation message sent by a source SN; or receive the CPC or CPA cancellation message sent by a target MN; or receive the CPC or CPA cancellation message sent by a second target SN.

In some embodiments, the target MN is a first target MN that is not selected by a terminal device for an access, or a second target MN that is selected by a terminal device for an access.

In some embodiments, the processing module 1010 is further configured to initiate a cancellation process of the CPC configuration or the CPA configuration based on the CPC or CPA cancellation message, respectively, to release a resource reserved by the first target SN for the terminal device.

Figure 11:
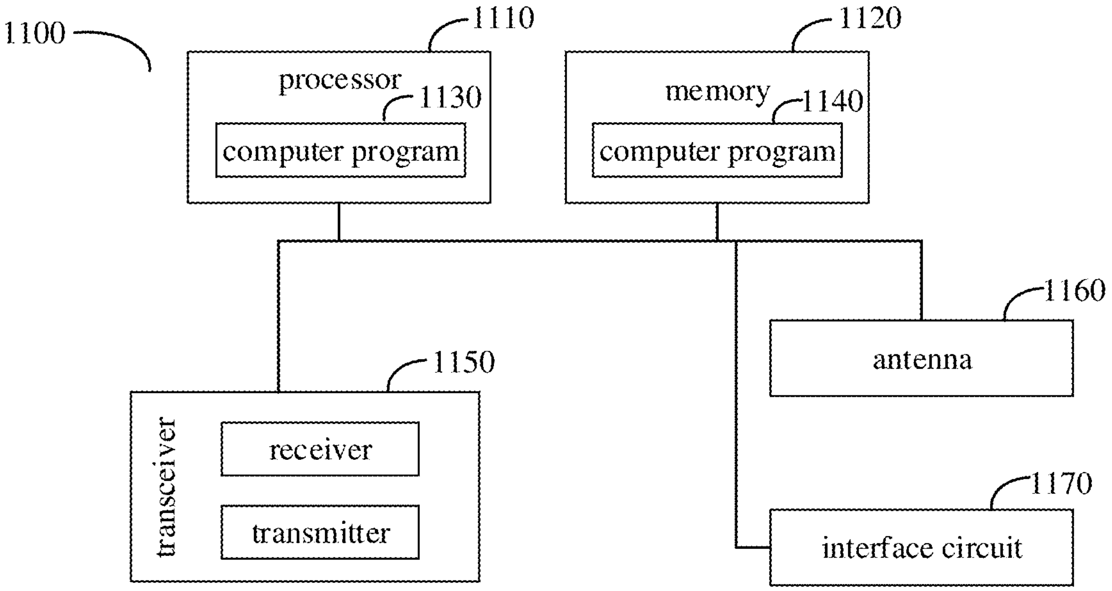
FIG. 11 is a schematic block diagram of a communication apparatus provided in an embodiment of the present disclosure.

Referring to FIG. 11, which is a schematic block diagram of another communication device 1100 provided in an embodiment of the present disclosure, the communication device 1100 may be source MN, a target MN, a second target SN, a source SN and a first target SN, and may also be a chip, a chip system, or a processor that supports the source MN, the target MN, the second target SN, the source SN and the first target SN to implement the above methods. The device may be configured to implement the methods as described in the above method embodiments, and for details thereof, reference may be made to the descriptions in the above method embodiments.

The communication device 1100 may include one or more processors 1110. The processor 1110 may be a general-purpose processor or a special-purpose processor. For example, the processor 1110 may be a baseband processor or a central processing unit. The baseband processor may be configured to process a communication protocol and communication data, and the central processing unit may be configured to control a communication device (such as a base station, a baseband chip, the terminal device, a terminal device chip, a DU, a CU, or the like), execute computer programs, and process data of computer programs.

In some embodiments, the communication device 1100 may further include one or more memories 1120 having stored therein a computer program 1140. The processor 1110 executes the computer program 1140, to cause the communication device 1100 to implement the methods as described in the above method embodiments. In some embodiments, the memory 1120 may have stored therein data. The communication device 1100 and the memory 1120 may be provided separately or integrated together.

In some embodiments, the communication device 1100 may further include a transceiver 1150 and an antenna 1160. The transceiver 1150 may be called a transceiving element, a transceiving machine, a transceiving circuit or the like, for implementing a transceiving function. The transceiver 1150 may include a receiver and a transmitter. The receiver may be called a receiving machine, a receiving circuit or the like, for implementing a receiving function. The transmitter may be called a sending machine, a sending circuit or the like, for implementing a sending function.

In some embodiments, the communication device 1100 may further include one or more interface circuits 1170. The interface circuit 1170 is configured to receive a code instruction and transmit the code instruction to the processor 1110. The processor 1110 runs the code instruction to enable the communication device 1100 to execute the methods as described in the above method embodiments.

In an implementation, the processor 1110 may include the transceiver configured to implement receiving and sending functions. For example, the transceiver may be a transceiving circuit, an interface, or an interface circuit. The transceiving circuit, the interface or the interface circuit configured to implement the receiving and sending functions may be separated or may be integrated together. The above transceiving circuit, interface or interface circuit may be configured to read or write codes/data, or the above transceiving circuit, interface or interface circuit may be configured to transmit or transfer signals.

In an implementation, the processor 1110 may have stored therein a computer program 1130 that, when running on the processor 1110, causes the communication device 1100 to implement the methods as described in the above method embodiments. The computer program 1130 may be embedded in the processor 1110, and in this case, the processor 1110 may be implemented by a hardware.

In an implementation, the communication device 1100 may include a circuit, and the circuit may implement the sending, receiving or communicating function in the foregoing method embodiments. The processor and the transceiver described in the present disclosure may be implemented on an integrated circuit (IC), an analog IC, a radio frequency integrated circuit (RFIC), a mixed-signal IC, an application specific integrated circuit (ASIC), a printed circuit board (PCB), an electronic device, etc. The processor and the transceiver may also be manufactured using various IC process technologies, such as a complementary metal oxide semiconductor (CMOS), a negative metal-oxide-semiconductor (NMOS), a positive channel metal oxide semiconductor (PMOS), a bipolar junction transistor (BJT), a bipolar CMOS (BiCMOS), silicon germanium (SiGe), gallium arsenide (GaAs), etc.

The communication device described in the above embodiments may be the terminal device or the network device, but the scope of the communication device described in the present disclosure is not limited thereto, and a structure of the communication device is not limited by FIG. 11. The communication device may be a stand-alone device or may be a part of a larger device. For example, the communication device may be: (1) a stand-alone integrated circuit (IC), or a chip, or a chip system or subsystem; (2) a set of one or more ICs, in which optionally, the set of ICs may also include a storage component for storing data and computer programs; (3) an ASIC, such as a modem; (4) a module that may be embedded in other devices; (5) a receiver, a terminal device, an intelligent terminal device, a cellular phone, a wireless device, a handheld machine, a mobile unit, a vehicle device, a network device, a cloud device, an artificial intelligence device, etc.; (6) others.

Figure 12:
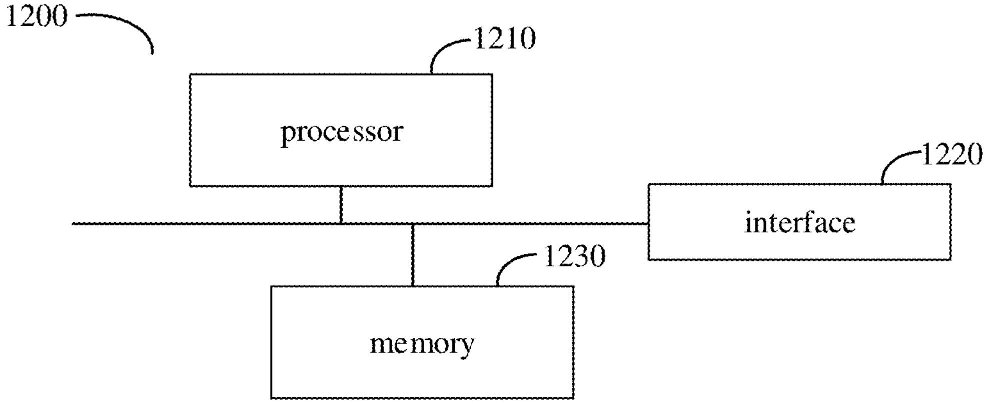
FIG. 12 is a schematic block diagram of a chip provided in an embodiment of the present disclosure.

For the case where the communication device may be a chip or a chip system, reference may be made to a schematic diagram of the chip shown in FIG. 12. The chip shown in FIG. 12 includes a processor 1210 and an interface 1220. In the chip, one or more processors 1210 may be provided, and more than one interface 1220 may be provided.

In some embodiments, the chip further includes a memory 1230 for storing necessary computer programs and data.

Those skilled in the art may also understand that various illustrative logical blocks and steps listed in embodiments of the present disclosure may be implemented by an electronic hardware, a computer software, or a combination thereof. Whether such functions are implemented by a hardware or a software depends on specific applications and design requirements of an overall system. For each specific application, those skilled in the art may use various methods to implement the described functions, but such an implementation should not be understood as extending beyond the protection scope of embodiments of the present disclosure.

Embodiments of the present disclosure further provide a system for canceling a CPC configuration or a CPA configuration. The system includes the communication apparatus as the terminal device and the communication apparatus as the network device as described in the aforementioned embodiments in FIG. 10, or the system includes the communication device as the terminal device and the communication device as the network device as described in the aforementioned embodiments in FIG. 11.

The present disclosure further provides a readable storage medium having stored thereon instructions that, when executed by a computer, cause functions of any of the above method embodiments to be implemented.

The present disclosure further provides a computer program product that, when executed by a computer, causes functions of any of the above method embodiments to be implemented.

The above embodiments may be implemented in whole or in part by a software, a hardware, a firmware or any combination thereof. When implemented using the software, the above embodiments may be implemented in whole or in part in a form of the computer program product. The computer program product includes one or more computer programs. When the computer program is loaded and executed on the computer, all or some of the processes or functions according to embodiments of the present disclosure will be generated. The computer may be a general purpose computer, a special purpose computer, a computer network, or other programmable devices. The computer program may be stored in a computer-readable storage medium or transmitted from one computer-readable storage medium to another computer-readable storage medium. For example, the computer program may be transmitted from one website, computer, server or data center to another website, computer, server or data center in a wired manner (such as via a coaxial cable, an optical fiber, a digital subscriber line (DSL)) or a wireless manner (such as an infrared manner, a cordless manner, via microwave, or the like). The computer-readable storage medium may be any available medium that can be accessed by the computer, or a data storage device such as the server or the data center integrated with one or more available media. The available medium may be a magnetic medium (for example, a floppy disk, a hard disk, or a magnetic tape), an optical medium (for example, a high-density digital video disc (DVD)), a semiconductor medium (for example, a solid state disk (SSD)), or the like.

Those of ordinary skill in the art can understand that the first, second, and other numeral numbers involved in the present disclosure are distinguished only for convenience of description, and are not intended to limit the scope of embodiments of the present disclosure, and nor are they intended to represent sequential order.

The term "at least one" used in the present disclosure may also be described as one or more, and the term "a plurality of" may cover two, three, four or more, which are not limited in the present disclosure. In embodiments of the present disclosure, for a certain kind of technical feature, the technical features in this kind of technical feature are distinguished by term like "first", "second", "third", "A", "B", "C" and "D", etc., and these technical features described with the "first", "second", "third", "A", "B", "C" and "D" have no order of precedence or size.

The correspondence shown in each table in the present disclosure may be configured or predefined. The values of information in each table are just examples, and may be configured as other values, which are not limited in the present disclosure. When configuring a correspondence between the information and various parameters, it is not necessary to configure all the correspondences shown in the tables. For example, the correspondences shown in some rows of the tables in the present disclosure may not be configured. For another example, appropriate variations or adjustments (such as splitting, merging, and so on) can be made based on the above tables. The names of parameters shown in the titles of the above tables may also adopt other names understandable in the communication device, and the values or representations of the parameters may also be other values or representations understandable in the communication device. When the above tables are implemented, other data structures may also be used, for example, arrays, queues, containers, stacks, linear tables, pointers, linked lists, trees, graphs, structural bodies, classes, heaps, or hash tables may be used.

The term "predefinition" in the present disclosure may be understood as definition, pre-definition, storage, pre-storage, pre-negotiation, pre-configuration, curing, or pre-firing.

Those of ordinary skill in the art can appreciate that the units and algorithm steps of various examples described in conjunction with embodiments disclosed herein may be implemented by the electronic hardware, or a combination of the computer software and the electronic hardware. Whether these functions are executed by the hardware or the software depends on the specific applications and design constraints of the technical solution. For each particular application, those skilled in the art may use different methods to implement the described functions, but such an implementation should not be considered as extending beyond the scope of the present disclosure.

Those skilled in the art can clearly understand that for the convenience and brevity of the description, for the specific working process of the above-described system, device and unit, reference may be made to the corresponding process in the foregoing method embodiments, which will not be repeated here.

The above only describes some specific implementations of the present disclosure, but the protection scope of the present disclosure is not limited thereto. Any changes or substitutions that are conceivable to those skilled in the art within the technical scope of the present disclosure should fall within the protection scope of the present disclosure. Therefore, the protection scope of the present disclosure should be determined by the protection scope of the claims.

What is claimed is:

1. A method for cancelling a conditional primary secondary cell (PScell) change configuration or a conditional PScell addition configuration, performed by a source master node (MN), comprising:

determining one or more target MNs on which a conditional handover (CHO) is to be cancelled;

sending a handover cancellation message to the one or more target MNs, wherein the handover cancellation message is used to instruct the one or more target MNs to cancel the CHO;

wherein the one or more target MNs that receive the handover cancellation message are configured to determine a first target secondary node (SN) on which the conditional PScell change configuration or the conditional PScell addition configuration is to be cancelled, and send a conditional PScell change or addition cancellation message to the first target SN, to cancel the conditional PScell change configuration or the conditional PScell addition configuration of the first target SN, and release a resource reserved in the first target SN;

wherein the first target SN is:

a target SN corresponding to a PSCell or a secondary cell group (SCG) corresponding to the conditional PScell change configuration or the conditional PScell addition configuration; and wherein the target MN is a first target MN that is not selected by a terminal device for an access, or a second target MN that is selected by a terminal device for an access.

2. The method according to claim 1, wherein the first target SN is a target SN where the PSCell or the SCG is located, wherein a terminal device needs to access the PSCell or the SCG to execute the conditional PScell change configuration or the conditional PScell addition configuration.

3. The method according to claim 1, further comprising:

sending a CHO cancellation message to the at least one first target MN, wherein the CHO cancellation message corresponds to a handover cancellation message and is used to instruct the at least one first target MN to cancel the CHO configuration to release a resource reserved for a terminal device.

4. The method according to claim 1, further comprising:

sending the conditional PScell change or addition cancellation message to at least one first target SN.

5. The method according to claim 1, further comprising:

sending the conditional PScell change or addition cancellation message to at least one target MN, wherein the conditional PScell change or addition cancellation message instructs the at least one target MN to cancel the conditional PScell change configuration or the conditional PScell addition configuration on at least one first target SN, and the conditional PScell change or addition cancellation message is used to request the at least one first target SN to release a resource reserved for the terminal device.

6. The method according to claim 1, wherein cancelling the conditional PScell change configuration is based on that a network side is configured with a conditional handover (CHO) configuration and the conditional PScell change configuration or cancelling the conditional PScell addition configuration is based on that a network side is configured with a CHO configuration and the conditional PScell addition configuration; or cancelling the conditional PSCell change configuration or cancelling the conditional PSCell addition configuration for a PCell change with PSCell addition or change that is executed by a terminal when execution conditions for both candidate PCell and an associated candidate PSCell are met.

7. The method according to claim 1, further comprising:

sending the conditional PSCell change or addition cancellation message to one or more first target SNs.

8. The method according to claim 1, further comprising:

sending the conditional PSCell change or addition cancellation message to the one or more target MNs, wherein the conditional PSCell change or addition cancellation message instructs the one or more target MNs to cancel the conditional PSCell change configuration or the conditional PSCell addition configuration on one or more first target SNs.

9. A method for canceling a conditional primary secondary cell (PScell) change configuration or a conditional PScell addition configuration, performed by a target master node (MN), comprising:

receiving a handover cancellation message sent by a source MN, and cancelling a conditional handover (CHO);

determining a first target secondary node (SN) on which the conditional PScell change configuration or the conditional PScell addition configuration is to be canceled, wherein the first target SN is a target SN corresponding to a PSCell or a secondary cell group (SCG) corresponding to the conditional PScell change configuration or the conditional PScell addition configuration;

sending, by the target MN that received the handover cancellation message, a conditional PScell change or addition cancellation message to at least one first target SN to cancel the conditional PScell change configuration or the conditional PScell addition configuration of the at least one first target SN and release a resource reserved in a node;

wherein the target MN is a first target MN that is not selected by a terminal device for an access, or a second target MN that is selected by a terminal device for an access.

10. The method according to claim 9, further comprising:

canceling a CHO configuration on the first target MN, wherein the target MN is the first target MN.

11. The method according to claim 10, wherein canceling the CHO configuration on the first target MN comprises:

receiving a CHO cancellation message sent by a source MN, and canceling the CHO configuration based on the CHO cancellation message to release a resource reserved for the terminal device.

12. The method according to claim 9, wherein sending the conditional PScell change or addition cancellation message to the at least one first target SN comprises:

sending the conditional PScell change or addition cancellation message to at least one first target SN associated with the target MN; or, sending the conditional PScell change or addition cancellation message to all or some of the at least one first target SN, wherein the target MN is the second target MN.

13. The method according to claim 9, wherein sending the conditional PScell change or addition cancellation message to the at least one first target SN further comprises:

receiving a CHO cancellation message sent by a source node, and sending the conditional PScell change or addition cancellation message to all or some of the at least one associated first target SN; or receiving the conditional PScell change or addition cancellation message sent by a source node, and sending the conditional PScell change or CPA cancellation message to the at least one indicated first target SN that; or receiving the conditional PScell change or addition cancellation message sent by a source node, and sending the conditional PScell change or addition cancellation message to all or some of the at least one associated first target SN.

14. The method according to claim 9, further comprising: the conditional PScell change or addition cancellation message being used to request the first target SN to release a resource reserved for a terminal device.

15. The method according to claim 11, wherein the CHO cancellation message corresponds to a handover cancellation message.

16. The method according to claim 9, wherein cancelling the conditional PScell change configuration is based on that a network side is configured with a conditional handover (CHO) configuration and the conditional PScell change configuration or cancelling the conditional PScell addition configuration is based on that a network side is configured with a CHO configuration and the conditional PScell addition configuration; or cancelling the conditional PSCell change configuration or cancelling the conditional PSCell addition configuration for a PCell change with PSCell addition or change that is executed by a terminal when execution conditions for both candidate PCell and an associated candidate PSCell are met.

17. The method according to claim 9, wherein the first target SN is a target SN where the PSCell or the SCG is located, wherein a terminal device needs to access the PSCell or the SCG to execute the conditional PScell change configuration or the conditional PScell addition configuration.

18. A method for canceling a conditional primary secondary cell (PScell) change configuration or a conditional PScell addition configuration, performed by a first target secondary node (SN), comprising:

receiving a conditional PScell change or addition cancellation message sent by a target master node (MN);

canceling the conditional PScell change configuration or the conditional PScell addition configuration of the first target SN based on the conditional PScell change or addition cancellation message, respectively, and releasing a resource reserved by the first target SN for a terminal device;

wherein the first target SN is a target SN corresponding to a PSCell or a secondary cell group (SCG) corresponding to the conditional PScell change configuration or the conditional PScell addition configuration;

wherein the target MN is a target MN that receives a handover cancellation message from a source MN and cancels the CHO;

wherein the target MN is a first target MN that is not selected by a terminal device for an access, or a second target MN that is selected by a terminal device for an access.

19. The method according to claim 18, wherein canceling the conditional PScell change configuration or the conditional PScell addition configuration of the first target SN based on the conditional PScell change or addition cancellation message, respectively, comprises:

initiating a cancellation process of the conditional PScell change configuration or the conditional PScell addition configuration of the first target SN based on the conditional PScell change or addition cancellation message, respectively, wherein the conditional PScell change or addition cancellation message is used to request the first target SN to release a resource reserved by the first target SN for the terminal device.

20. The method according to claim 18, wherein cancelling the conditional PScell change configuration is based on that a network side is configured with a conditional handover (CHO) configuration and the conditional PScell change configuration or cancelling the conditional PScell addition configuration is based on that a network side is configured with a CHO configuration and the conditional PScell addition configuration; or cancelling the conditional PSCell change configuration or cancelling the conditional PSCell addition configuration for a PCell change with PSCell addition or change that is executed by a terminal when execution conditions for both candidate PCell and an associated candidate PSCell are met.

* * * * *